June 11, 1963
R. J. HODGES
3,093,283
TAPE-FEEDING APPARATUS
Filed June 20, 1961
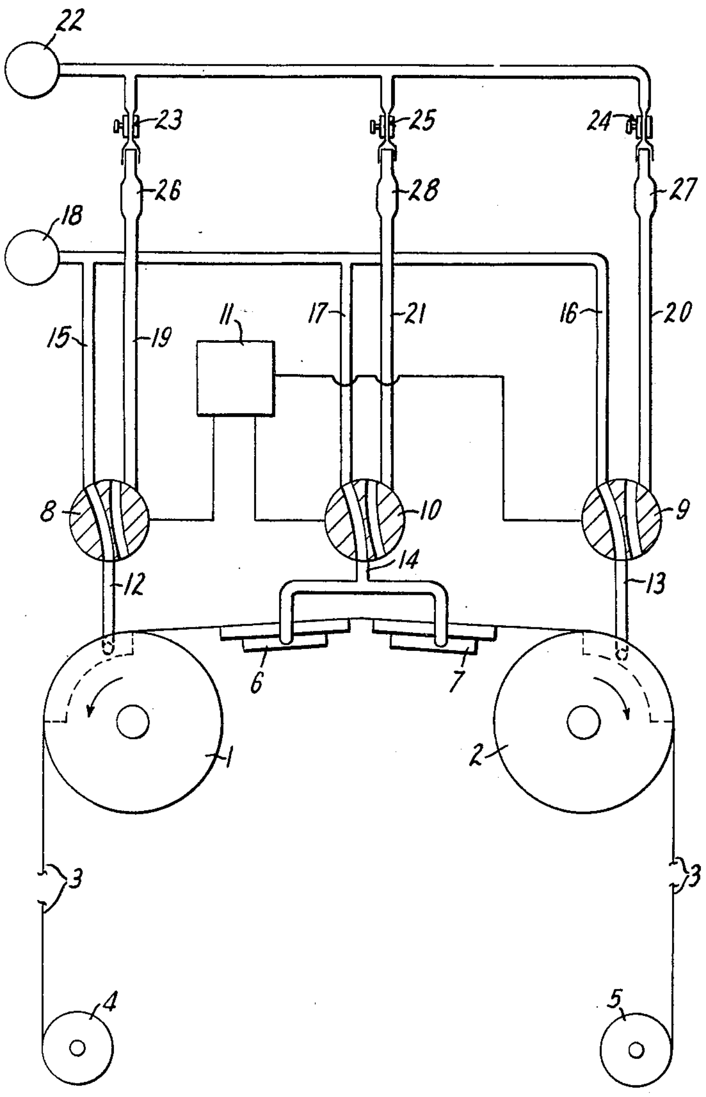
Inventor
ROBERT J. HODGES
By Irvine and Smiley
Attorneys 3,093,283
TAPE-FEEDING APPARATUS Robert James Hodges, Newport, England, assignor to International Computers and Tabulators Limited, London, England, a British company
Filed June 20, 1961, Ser. No. 118,374
Claims priority, application Great Britain July 14, 1960
4 Claims. (Cl. 226—95)

This invention relates to tape-feeding apparatus and in particular to apparatus for controlling movement of a tape to and from a spool.

When a tape, for example a magnetic tape, is employed to control a statistical machine, for example a computer, it is usual to feed the tape to and from a pair of spools past a read and/or write head by pneumatic capstans continuously rotatable in opposite directions, a pneumatic braking device being located between the capstans to retain the tape in an arrested position thereof. It is found, however, that operation of the apparatus is retarded by the time taken for the negative air pressure to decay when cut-off from a capstan or the brake device and to reduce this time it has been proposed to follow the cutting off of the negative air pressure by the application of positive air pressure to the capstan or brake device. The maintenance of the positive air pressure tends to form the tape into a loop spaced from the capstan or brake device and this sometimes results in skewing of the tape with consequent loss of register, delay in pick-up when the negative air pressure is re-applied, stressing of the tape during starting and stopping, and when the tape is a magnetic tape possible damage to the oxide surface of the tape. It is a main object of the present invention to provide apparatus for controlling the movement of a tape which reduces these undesirable conditions to a minimum.

According to the invention there is provided apparatus for controlling movement of a tape to and from a spool, wherein the admission of negative air pressure or of positive air pressure to a tape-engaging member is controlled by a double-acting valve and a constriction device is interposed between the valve and a source of positive air pressure of predetermined value greater than that of atmospheric pressure whereby on operation of the valve to connect said member with the source of positive air pressure a predetermined pressure is rapidly released to free the tape from said member and is immediately followed by positive air pressure at a considerably reduced pressure to retain the tape free from said member but in close proximity therewith.

In order that the invention may be clearly understood one embodiment thereof will now be described, by way of example, with reference to the accompanying diagrammatic drawing which is an elevation partly in section of a magnetic tape feeding apparatus arranged for control by a computer.

Referring to the drawing, the apparatus includes two capstans 1, 2 continuously rotatable in opposite directions to effect the movement of a tape 3 to and from spools 4, 5. Between the capstans there are located braking devices 6, 7 arranged to retain the tape in arrested positions thereof. The construction of the capstans 1, 2 and braking devices 6, 7 is not described herein as such elements are well known in the art, it being sufficient to the understanding of the invention for it to be mentioned that, as is customary, the capstans and brake devices have perforated tape-engaging surfaces whereby the tape is caused to adhere thereto by the application of negative air pressure applied to the interior of the elements.

The capstans and brake means are respectively controlled by double-acting valves 8, 9, 10 of any known construction, the valve 10 being common to the braking devices 6, 7. Operation of the valves is controlled by operating means 11 which are of any known form capable of control by signals received thereby from a computer. In a preferred embodiment of the invention the operating means 11 comprises an electronic drive circuit.

The valves 8, 9, 10 are connected by air lines 12, 13, 14 with the capstans and braking devices and by lines 15, 16, 17 with a source of negative air pressure such as a suction pump indicated by the reference 18. The valves 8, 9, 10 are also connected by air lines 19, 20, 21 with a source of positive air pressure such as a pump indicated by the reference 22. Between the pump 22 and the valves 8, 9, 10 there are located in the air lines 19, 20, 21 constriction devices 23, 24, 25 each of which preferably comprises an adjustable throttle.

The pump 22 is arranged to operate with a predetermined output of high pressure value which in a preferred embodiment of the invention is 10 pounds per suare inch above atmosphere and the constriction devices are arranged to restrict to a predetermined low pressure value the passage air to the valves. In a preferred embodiment of the invention the predetermined low value is ½ pound per square inch above atmosphere.

When the tape 3 is in an arrested position thereof negative air pressure is applied to the braking devices 6, 7 so that the tape is sucked into engagement therewith. The valves 8, 9 are open to positive air pressure from pump 22 and air at said low pressure value frees the tape from the capstans 1, 2 so that it is free therefrom but is retained in close proximity therewith in a manner such that the tape virtually floats on the capstans while being unaffected by the rotation thereof.

If now a signal is received by the operating means 11 requiring the tape to be moved to the left, as viewed in the drawing, the operating means closes valve 10 to pump 18 and opens it to pump 22. While the valve 10 has been closed to pump 22 air pressure between the constriction device 25 and valve 10 has built-up to the high pressure value of the pump and on opening of the valve the volume of air of high pressure value between the device 25 and valve 10 is rapidly released to the braking devices 6, 7 and frees the tape from the braking devices. Immediately the small volume of high pressure value air has been released it is followed by low pressure value air which retains the tape free from the braking devices but in close proximity therewith. Simultaneously with the operation of valve 10 the valve 8 is also operated to close the valve to pump 22 and to open the valve to pump 18, thus as the tape is already in close proximity with the periphery of capstan 1 it is gripped and moved thereby towards spool 4.

It will be understood that when a further signal is received by the operating means 11, either requiring the stopping of the tape or the reversal of the direction of movement thereof, the valve 8 is closed to pump 18 and is opened to pump 22 so that a puff of high pressure value air frees the tape from capstan 1 and is immediately followed by a stream of low pressure value air which causes the tape to float in close proximity with capstan 1.

In some instances the length of air line between a constriction device and the valve connected thereto is sufficient to contain the desired predetermined volume of high pressure value air but if this should not suffice the air lines 19, 20, 21 may include reservoirs 26, 27, 28.

It will be understood that the interval of time which must elapse between successive tape movements is determined by the length of time necessary to the building-up of high pressure value air between a constriction device and the valve connected therewith and to avoid undue delays this interval of time is correlated with the time cycle of the operating means 11.

I claim:

1. Apparatus for controlling movement of a tape to and from a spool, comprising a tape-engaging member arranged to cause a tape to be adhered thereto by negative air pressure, a source of negative air pressure, a source of positive air pressure of predetermined high pressure value greater than atmospheric pressure, a double-acting valve connected respectively with said member, said source of negative air pressure and said source of positive air pressure by first, second, and third air lines and operable to connect said member alternately with each of said sources, operating means operatively connected with said valve to effect operation thereof to admit negative or positive air pressure to said member, and a constriction device connected in said third air line between said valve and the source of positive air pressure and arranged to restrict to a predetermined low pressure value the passage of positive air pressure to the part of the third air line between said device and valve and while the valve is closed to said source of positive air pressure to build up in said part a predetermined volume of air at said predetermined high pressure whereby when the valve is opened to the source of positive air pressure said built up predetermined volume of air is rapidly released to free the tape from said member and is immediately followed by air at said low pressure value to retain the tape free from said member but in close proximity therewith.

2. Apparatus according to claim 1, including a reservoir interposed in said third air line between the valve and said constriction device.

3. Apparatus for controlling movement of a tape to and from a pair of spools, comprising a pair of capstans, one for each spool, continuously rotatable in opposite directions and each arranged to cause a tape to be adhered thereto by negative air pressure for movement thereby between the capstans, brake means located between the capstans to retain the tape in an arrested position thereof, a source of negative air pressure, a source of positive air pressure of predetermined high pressure value greater than atmospheric pressure, a double-acting valve for each of said capstans and for said brake means, a first air line connecting each capstan and the brake means with the valve appropriate thereto, a second air line and a third air line for each valve and connecting the valve respectively to said source of negative air pressure and said source of positive air pressure, each said valve being operable to connect its first air line alternately with each of said sources, operating means common to and operatively connected to each of said valves to effect selective operation thereof, and connected in each of said third air lines a constriction device between the valve connected to said third air line and the source of positive air pressure and arranged to restrict to a predetermined low pressure value the passage of positive air pressure to the part of the third air line between said device and the valve to which the third air line is connected and while the valve is closed to said source of positive air pressure to build up in said part a predetermined volume of air at said predetermined high pressure whereby when the valve is opened to the source of positive air pressure said built-up volume of air is rapidly released to free the tape from the capstan or brake means connected to the valve and is immediately followed by air at said low pressure value to retain the tape free from said capstan or brake means but in close proximity therewith.

4. Apparatus according to claim 3, including a reservoir interposed in each said third air line between the valve and said constriction device.

References Cited in the file of this patent

UNITED STATES PATENTS

| | | |
|---|---|---|
| 2,852,253 | Pouliart et al. | Sept. 16, 1958 |
| 2,866,637 | Pendleton | Dec. 30, 1958 |